US010360943B2

(12) United States Patent
Hsieh et al.

(10) Patent No.: US 10,360,943 B2
(45) Date of Patent: Jul. 23, 2019

(54) METHOD, DEVICE AND SYSTEM FOR EDITING VIDEO

(71) Applicant: Wistron Corporation, New Taipei (TW)

(72) Inventors: Chia-Ta Hsieh, New Taipei (TW); Ching-An Cho, New Taipei (TW); Zhen-Te Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 19 days.

(21) Appl. No.: 15/821,842

(22) Filed: Nov. 24, 2017

(65) Prior Publication Data

US 2019/0080718 A1    Mar. 14, 2019

(30) Foreign Application Priority Data

Sep. 13, 2017 (TW) .............................. 106131373 A

(51) Int. Cl.
| | |
|---|---|
| *G11B 27/031* | (2006.01) |
| *H04N 21/854* | (2011.01) |
| *H04N 21/432* | (2011.01) |
| *H04N 21/234* | (2011.01) |
| *H04N 21/2343* | (2011.01) |

(52) U.S. Cl.
CPC ....... *G11B 27/031* (2013.01); *H04N 21/2343* (2013.01); *H04N 21/23418* (2013.01); *H04N 21/4325* (2013.01); *H04N 21/854* (2013.01)

(58) Field of Classification Search
CPC ............. G11B 27/031; H04N 21/4325; H04N 21/854; H04N 21/23418; H04N 21/2343
See application file for complete search history.

(56) References Cited

U.S. PATENT DOCUMENTS

| 5,973,732 | A | 10/1999 | Guthrie | |
|---|---|---|---|---|
| 9,740,895 | B1 * | 8/2017 | Liu | .................. G06Q 10/00 |
| 2009/0263021 | A1 | 10/2009 | Takamori et al. | |
| 2009/0315996 | A1 * | 12/2009 | Guler | .................. G01S 3/7864 |
| | | | | 348/169 |
| 2017/0244959 | A1 * | 8/2017 | Ranjeet | ............ G08B 13/19641 |

OTHER PUBLICATIONS

Wen-Yan Lin et al.,"Smoothly Varying Affine Stitching", Computer Vision and Pattern Recognition (CVPR), Jun. 20-25, 2011, pp. 1-13.
"Office Action of Taiwan Counterpart Application," dated Nov. 22, 2017, p. 1-p. 6, in which the listed references were cited.

* cited by examiner

*Primary Examiner* — Mishawn N. Hunter
(74) *Attorney, Agent, or Firm* — JCIPRNET

(57) ABSTRACT

A video editing method, a video editing device, and a video editing system are provided. A target is obtained from an original video. Relative position relations respectively between each frame and a previous frame and a next frame adjacent to it are obtained based on multiple image feature points of each frame. An adjustment process is executed respectively for each frame. The adjustment process includes: obtaining a frame N; identifying the target in the frame N; adjusting the frame N to obtain a new frame, wherein the target is located on a center of the new frame; and modifying the new frame based on the relative position relations to obtain a postproduction frame. A processed video is outputted based on multiple postproduction frames.

19 Claims, 7 Drawing Sheets

METHOD, DEVICE AND SYSTEM FOR EDITING VIDEO

CROSS-REFERENCE TO RELATED APPLICATION

This application claims the priority benefit of Taiwan application serial no. 106131373, filed on Sep. 13, 2017. The entirety of the above-mentioned patent application is hereby incorporated by reference herein and made a part of this specification.

BACKGROUND OF THE INVENTION

Field of the Invention

The invention relates to a method, a device, and a system for processing a video, and in particular, to a video editing method, a video editing device, and a video editing system.

Description of Related Art

Video recording has become one of the indispensable functions on mobile phones and cameras, but the quality of a video mostly depends on the skills of a user. In some examples, the mobile phone or camera moves overly fast or slowly, or the filmed subject is constantly off the center of the video. These examples are all caused by undesirable skills of the user. Particularly, in a scenario of a follow shot, the photographer and the filmed subject are both moving, making it especially difficult to record a good video. The current postproduction software usually only provides simple functions such as extraction and clipping, and the content of the video cannot be modified. Therefore, after clipping a video of poor quality, one can only obtain a clipped video of poor quality, and the quality of the video cannot be changed.

SUMMARY OF THE INVENTION

The invention provides a video editing method, a video editing device, and a video editing system, whereby a target in a video is located on a center of an image after processing, and quality of the video is enhanced.

The video editing method of the invention includes the following steps: receiving an original video, wherein the original video includes multiple frames; obtaining a target from the original video; obtaining relative position relations respectively between each frame and a previous frame and a next frame adjacent to it based on multiple image feature points of each frame; and executing an adjustment process for each frame. The adjustment process includes the following steps: retrieving a frame N from the frames; identifying the target in the frame N; adjusting the frame N to obtain a new frame, wherein the target is located on a center of the new frame; and modifying the new frame based on the relative position relations to obtain a postproduction frame. A processed video is outputted based on multiple postproduction frames.

In an embodiment of the invention, the step of adjusting the frame N to obtain the new frame, wherein the target is located on the center of the new frame includes: creating a blank frame according to a size of the frame N; and superimposing the frame N onto the blank frame by setting the target as a center of the blank frame to obtain the new frame.

In an embodiment of the invention, before the step of modifying the new frame based on the relative position relations to obtain the postproduction frame, the video editing method further includes: determining whether the new frame is complete, and modifying the new frame based on the relative position relations to obtain the postproduction frame in the case where the new frame is not complete; and storing the new frame as the postproduction frame without modifying the new frame in the case where the new frame is complete.

In an embodiment of the invention, in the case where the new frame is not complete, detecting a position of a blank region in the new frame; retrieving one of a frame N−1 and a frame N+1 corresponding to the frame N that is closer to the position as a compensation frame based on the relative position relations; and obtaining an adjusted image based on the new frame and the compensation frame.

In an embodiment of the invention, after the step of detecting the position of the blank region in the new frame, the video editing method further includes: setting a reference side based on the position of the blank region in the new frame; determining whether the frame N−1 and the frame N+1 are located on the reference side of the frame N; retrieving one of the frame N−1 and the frame N+1 that is closer to the reference side as the compensation frame based on the relative position relations if it is determined that the frame N−1 or the frame N+1 is located on the reference side of the frame N; and abandoning adjusting the frame N if it is determined that neither of the frame N−1 and the frame N+1 is located on the reference side of the frame N.

In an embodiment of the invention, the step of obtaining the adjusted image based on the new frame and the compensation frame includes: cutting a block corresponding to the blank region from the compensation frame according to the image feature points, and a size and the position of the blank region, and attaching the block to the blank region of the new frame.

In an embodiment of the invention, the step of obtaining the adjusted image based on the new frame and the compensation frame includes: superimposing the new frame onto the compensation frame based on the image feature points to obtain a superimposed image; and cutting a block having the same size as the new frame in the superimposed image with the target as the center.

In an embodiment of the invention, after the step of obtaining the adjusted image based on the new frame and the compensation frame: determining whether the adjusted image is complete; storing the adjusted image as the postproduction frame if the adjusted image is complete; and retrieving another frame that is adjacent to the compensation frame and is different from the frame N and continuing modifying based on the another frame if the adjusted image is not complete.

In an embodiment of the invention, the step of obtaining the relative position relations respectively between each frame and the previous frame and the next frame adjacent to it based on the image feature points of each frame includes: determining a first relative position of the frame N+1 relative to the frame N based on the image feature points in the fame N and the image feature points in the frame N+1; determining a second relative position of the frame N−1 relative to the frame N based on the image feature points in the frame N and the image feature points in the frame N−1; and storing the first relative position and the second relative position as the relative position relations of the frame N.

The video editing device of the invention includes: a storage device and a processor. The storage device stores multiple modules including a target selection module, a video preprocessing module, a video modification module, and a video output module. The processor is coupled to the storage device and executes the modules to edit an original video. The original video includes multiple frames. The target selection module receives the original video and obtains a target from the original video. The video preprocessing module obtains relative position relations respectively between each frame and a previous frame and a next frame adjacent to it based on multiple image feature points of each frame. The video modification module executes an adjustment process respectively for the frames. The adjustment process includes: retrieving a frame N from the frames; identifying the target in the frame N; adjusting the frame N to obtain a new frame, wherein the target is located on a center of the new frame; and modifying the new frame based on the relative position relations to obtain a postproduction frame. The video output module outputs a processed video based on multiple postproduction frames.

The video editing system of the invention includes: a computing server and an electronic device. The electronic device includes a first networking chip, a first storage device, and a first processor. The first storage device stores a target selection module. The first processor is coupled to the first storage device, executes the target selection module to receive an original video including multiple frames and obtain a target from the original video through the target selection module, and then transmits the original video and the target to the computing server through the first networking chip, such that the computing server executes video-editing on the original video. The computing server includes a second networking chip, a second storage device, and a second processor. The second networking chip receives the original video and the target from the electronic device via a network. The second storage device stores multiple modules including a video preprocessing module, a video modification module, and a video output module. The second processor is coupled to the second storage device and drives the modules to execute the video-editing. The video preprocessing module obtains relative position relations respectively between each frame and a previous frame and a next frame adjacent to it based on multiple image feature points of each frame. The video modification module executes an adjustment process respectively for the frames. The adjustment process includes: retrieving a frame N from the frames; identifying the target in the frame N; adjusting the frame N to obtain a new frame, wherein the target is located on a center of the new frame; and modifying the new frame based on the relative position relations to obtain a postproduction frame. The video output module outputs a processed video based on multiple postproduction frames.

In light of the above, in the invention, the target in the video is selected, and the target is placed on the center of the frame, and the adjacent frames are used to compensate. Therefore, the issue of deviation of the target from the center resulting from movement of the camera by the photographer can be corrected.

To provide a further understanding of the aforementioned and other features and advantages of the disclosure, exemplary embodiments, together with the reference drawings, are described in detail below.

DESCRIPTION OF THE EMBODIMENTS

Figure 1:
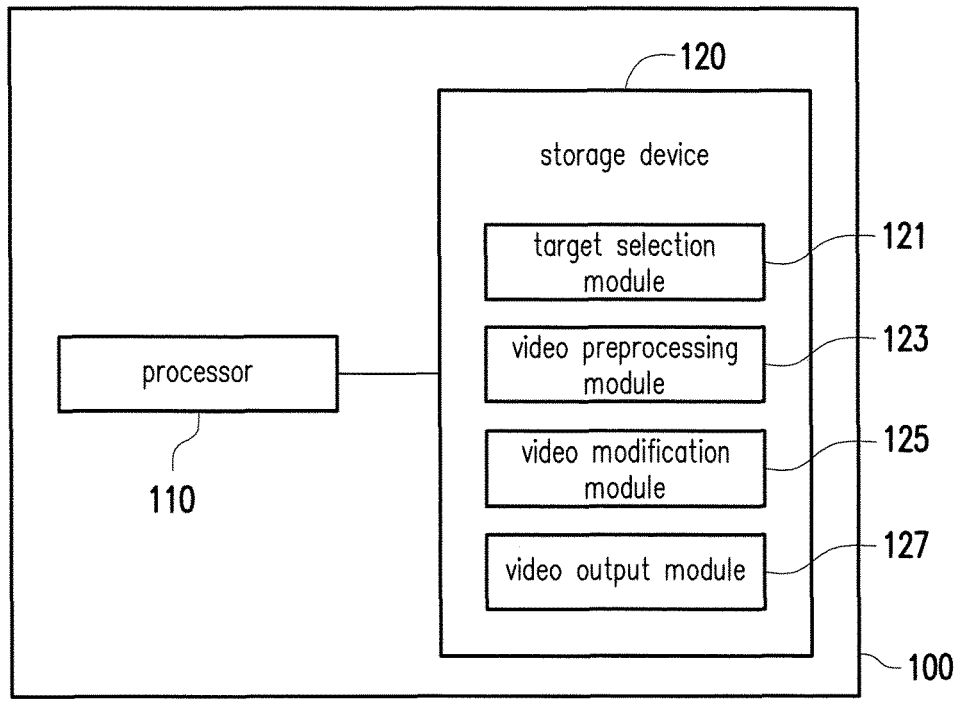
FIG. 1 is a block diagram illustrating a video editing device according to an embodiment of the invention.

FIG. 1 is a block diagram illustrating a video editing device according to an embodiment of the invention. Referring to FIG. 1, a video editing device 100 includes a processor 110 and a storage device 120. The storage device 120 includes a target selection module 121, a video preprocessing module 123, a video modification module 125, and a video output module 127.

The video editing device 100 is, for example, an electronic device having computational capacity, such as a smartphone, a desktop computer, a laptop, a tablet computer, a server, a smart TV, etc. The processor 110 is, for example, a central processing unit (CPU), a graphic processing unit (GPU), a physics processing unit (PPU), a programmable microprocessor, an embedded control chip, digital signal processor (DSP), an application specific integrated circuit (ASIC), or another similar device. The storage device 120 is, for example, a fixed or movable random access memory (RAM), read-only memory (ROM), flash memory, secure digital memory card (SD), hard disc of any form, another similar device, or a combination of these devices.

The processor 110 is coupled to the storage device 120 and drives the target selection module 121, the video preprocessing module 123, the video modification module 125, and the video output module 127 to execute editing of an original video.

Figure 2A:
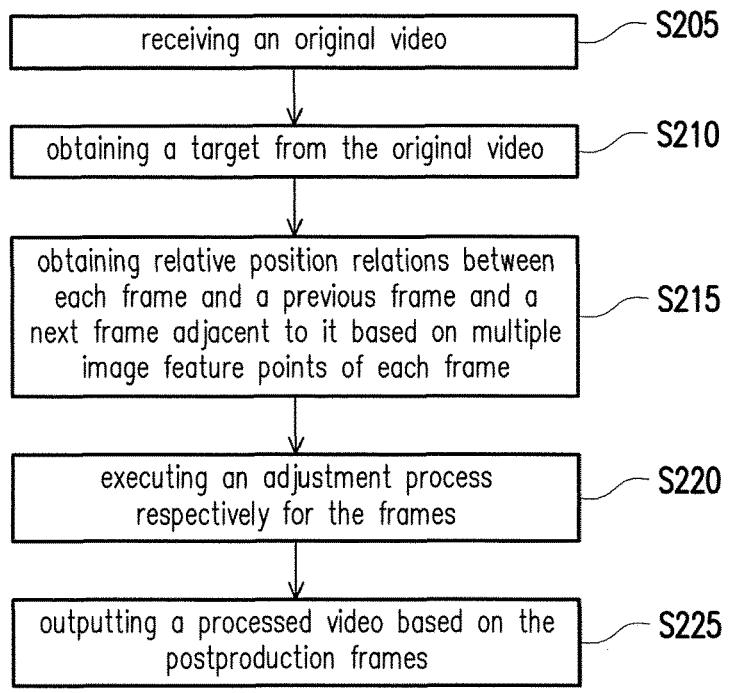
FIG. 2A and FIG. 2B are flowcharts illustrating a video editing method according to an embodiment of the invention.
Figure 2B:
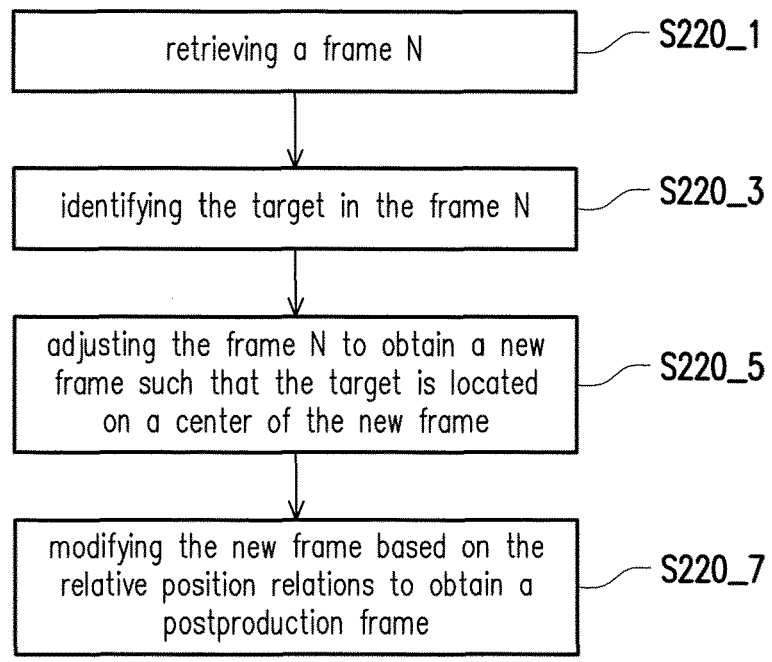

FIG. 2A and FIG. 2B are flowcharts illustrating a video editing method according to an embodiment of the invention. Referring to FIG. 1, FIG. 2A, and FIG. 2B, in step S205, the original video is received through the target selection module 121. The original video includes multiple frames. Moreover, after receiving the original video, the target selection module 121 obtains a size of the original video. For example, the video editing device 100 receives the original video from an imaging device via a Universal Serial Bus (USB), a wired network, or a wireless network (e.g., Ethernet or WiFi). However, the invention does not limit the source of the original video here.

Then, in step S210, the target selection module 121 obtains a target from the original video. Here, the target selection module 121 provides a box-select function, and the target is box-selected in one of the frames through the box-select function. For example, the video editing device 100 includes a display and an input device. The target selection module 121 displays the original video on the display to be played. A user pauses playing the video through the input device (e.g., a mouse or a touch screen), and then box-selects the target in the frame displayed at the time of pausing the video through the input device.

After obtaining the target, the target selection module 121 analyzes the target to obtain target features corresponding to it. For example, features such as patterns, colors, and contours may be obtained by using a histogram algorithm in the Open Source Computer Vision Library (Open CV) or a contour tracing algorithm. After obtaining the target features, the target selection module 121 stores the target features for later use.

Next, in step S215, relative position relations respectively between each frame and a previous frame and a next frame adjacent to it are obtained by the video preprocessing module 123 based on multiple image feature points of each frame.

Specifically, the video preprocessing module 123 may use feature point acquisition and feature point description methods such as the scale-invariant feature transform (SIFT) algorithm or the speeded up robust features (SURF) algorithm to obtain multiple image feature points in each frame and further store coordinates of each image feature point as well as a feature orientation, a feature strength, and a dimensional difference of each image feature point. Afterwards, the relative position relations respectively between each frame and the previous frame and the next frame adjacent to it are obtained by using the image feature points, and the image feature points and the relative position relations are stored. In other words, with respect to each frame, the relative position relation between each frame and the previous one frame adjacent to it and the relative position relation between each frame and the next one frame adjacent to it are recorded.

Here, when a frame N is processed, only the relative position relations between the frame N and a frame N−1 and between the frame N and a frame N+1 are determined. In other words, the video preprocessing module 123 determines a first relative position of the frame N+1 relative to the frame N based on the image feature points in the frame N and the image feature points in the frame N+1. Moreover, the video preprocessing module 123 determines a second relative position of the frame N−1 relative to the frame N based on the image feature points in the frame N and the image feature points in the frame N−1. Then, the first relative position and the second relative position are stored as the relative position relations of the frame N.

For ease of illustration, the relative position relations are determined based on left-right displacement below. However, in other embodiments, the relative position relations of up-down displacement may also be determined through similar means, and the invention is not limited hereto.

First, an image feature point A of the frame N is retrieved and is compared with all of the image feature points of the frame N+1 to find a point in the frame N+1 that matches the image feature point A. After matching between all of the image feature points of the frame N and all of the image feature points of the frame N+1 is completed, coordinates of two matching image feature points are used pair by pair to determine whether the frame N+1 is located on the left side or the right side of the frame N. Lastly, relative positions of each set of the matched image feature points are calculated to obtain a number of the sets determining the frame N+1 being located on the left side or the right side of the frame N, and the side with the higher number represents the relative position.

Figure 3:
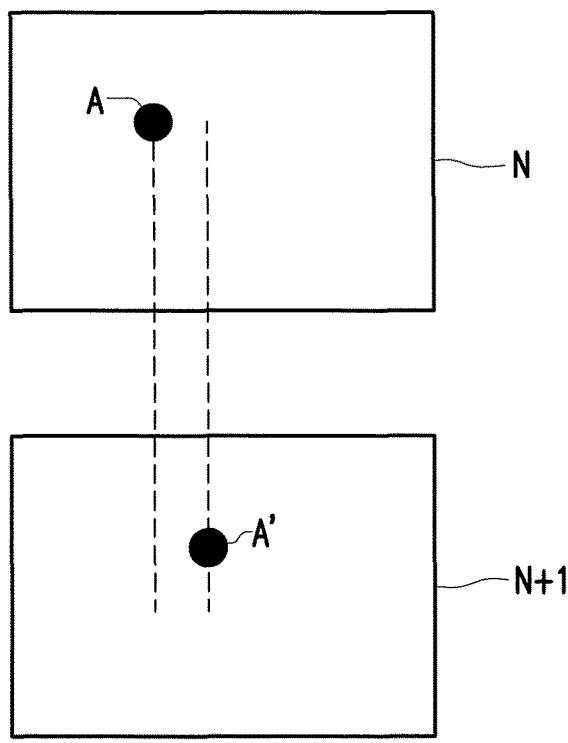
FIG. 3 is a schematic diagram illustrating determining relative position relations according to an embodiment of the invention.

FIG. 3 is a schematic diagram illustrating determining relative position relations according to an embodiment of the invention. Referring to FIG. 3, in a temporal sequence, the previous obtained frame of the frame N+1 is the frame N, and the image feature point A of the frame N matches an image feature point A' of the frame N+1. In the present embodiment, as an example for illustration, a camera is moved leftward and rightward (horizontal movement). The coordinates of the image feature point A' of the frame N+1 are located on the right side of the coordinates of the image feature point A of the frame N. In other words, the horizontal coordinate of the image feature point A' is greater than the horizontal coordinate of the image feature point A of the frame N. It means that the camera was moved leftward when the original video was filmed. Therefore, the frame N+1 includes content more leftward than content displayed by the frame N. Based on the above, in terms of the image feature point A, it is determined that the frame N+1 is located on the left side of the frame N, which is stored as N+1 {point A; L=1; R=0}, wherein L represents the left side, and R represents the right side. Analogously, the relative position relations of each set of the matched image feature points between the frame N and the frame N+1 can be found, and the relative position relations of each set of the matched image feature points between the frame N and the frame N−1 can be found.

For example, an image feature point A" (not illustrated) matching the image feature point A of the frame N is found in the frame N−1. It is determined that the coordinates of the image feature point A are located on the right side of the image feature point A" (for example, the camera films rightward), which is stored as N−1 {point A; L=0; R=1}. In other words, at each image feature point in each frame, the relative positions with respect to the adjacent previous one frame and the adjacent next one frame are correspondingly stored.

Moreover, in the case where the frame N+1 and the frame N−1 are located on the same side of the frame N, in another embodiment, the leftmost one (for example, the frame N+1) is found through comparison, and the corresponding position relations are stored as N+1 {point A; L=1; R=0}, N−1 {point A; L=0; R=0}.

In addition, in other embodiments, in the case where the camera is moved upward-downward (vertical movement), the relative position relations of the image feature point A are recorded as follows: if the frame N+1 is located on an upper side of the frame N, it is stored as N+1 {point A; U=1; D=0}; if the frame N+1 is located on a lower side of the frame N, it is stored as N+1 {point A; U=0; D=1}, wherein U represents the upper side and D represents the lower side.

After the image feature points are compared between the frame N and the frames N+1, N−1, the image feature points that appear in all of the three frames are calculated to find out whether the frame N+1 or the frame N−1 is located on the left side or the right side of the frame N. For example, the image feature points A, B, C appear in all of the frame N, the frame N+1, and the frame N−1. If the parameters corresponding to the frame N−1 are {point A; L=1; R=0}, {point B; L=0; R=0}, {point C; L=1; R=0}, it means that more than half of the image feature points (A, C) vote that the frame N−1 is located on the left side of the frame N. In other words, after the common image feature points are calculated, there are more image feature points determining that the frame N−1 is located on the left side of the frame N. Accordingly, it is determined that the frame N−1 is located on the left side of the frame N. Similarly, the frame N+1 may be determined by the same approach.

Returning to FIG. 2A, in step S220, the video modification module 125 executes an adjustment process respectively for the frames. Here, the adjustment process includes steps S220_1 to S220_7, as shown in FIG. 2B.

In step S220_1, the frame N is retrieved. Then, in step S220_3, the target in the frame N is identified. For example, starting from a 1st frame, a frame N is sequentially retrieved, wherein N is greater than or equal to 1. The video modification module 125 may find the target based on target features through a mean shift algorithm or a support vector machine (SVM). After analyzing the target obtained from the original video and obtaining the corresponding target features, the target selection module 121 stores the target features for the video modification module 125 to use.

In step S220_5, the frame N is adjusted to obtain a new frame such that the target is located on a center of the new frame. For example, according to the size of the frame N, the video modification module 125 creates a blank frame, and superimposes the frame N onto the blank frame by setting the target as a center of the blank frame to obtain the new frame. Alternatively, the frame N is superimposed onto the blank frame, and then the target is moved to become the center. The sequence is not specifically limited here.

Figure 4:
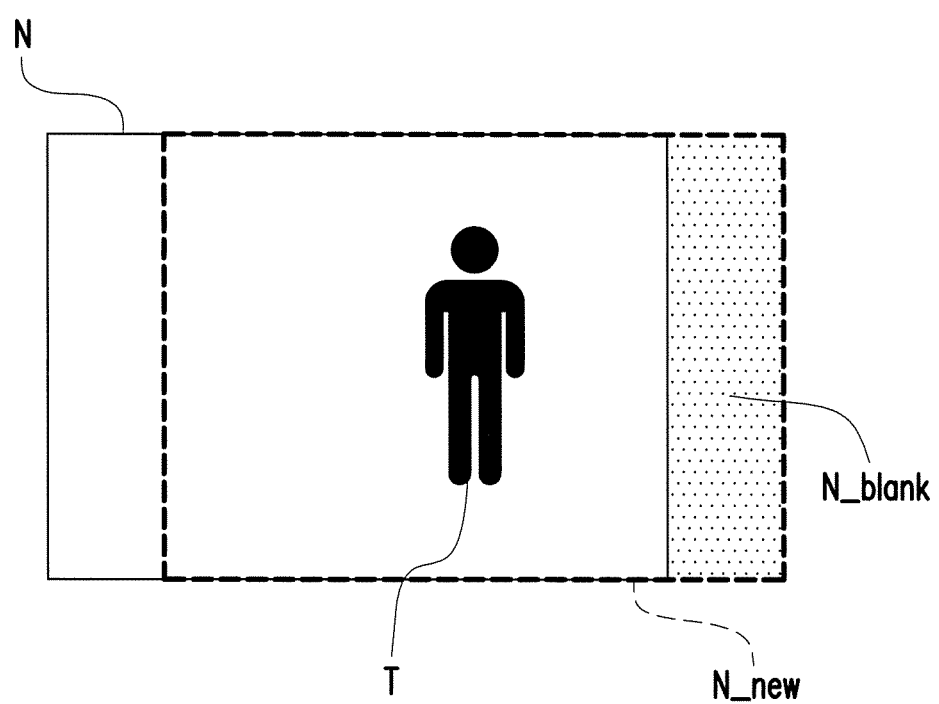
FIG. 4 is a schematic diagram illustrating creating a new frame according to an embodiment of the invention.

FIG. 4 is a schematic diagram illustrating creating a new frame according to an embodiment of the invention. Referring to FIG. 4, the frame N is adjusted to set a target T as the center to obtain a new image N_new. Here, the new image N_new is rendered in broken lines. Where the target T is not located on the center of the frame N, a blank region N_blank exists in the obtained new image N_new. In the present embodiment, the target T is slightly to the right side of the frame N, and the blank region N_blank exists on the right side of the obtained new image N_new. In other embodiments, if the target T is slightly to the left side of the frame N, the blank region exists on the left side of the obtained new image N_new.

Returning to FIG. 2B, in step S220_7, the new frame is modified based on the relative position relations to obtain a postproduction frame. According to where the blank region in the new frame is located in the new frame, the video modification module 125 selects the frame N+1 or the frame N−1 adjacent to the frame N to modify the new frame and obtain the postproduction frame. For example, when the blank region is located on the left side, the one of the frame N+1 and the frame N−1 that is located on the left side of the frame N is retrieved to modify the new frame; when the blank region is located on the right side, the one of the frame N+1 and the frame N−1 that is located on the right side of the frame N is retrieved to modify the new frame. In another embodiment, the rightmost frame or the leftmost frame is selected for modification, for example, through superimposing the image feature points, or superimposing after scaling or rotating according to the image feature points. Moreover, the obtained postproduction frame may be further stored to a post-modification database.

Lastly, returning to FIG. 2A, in step S225, the video output module 127 outputs the processed video based on the postproduction frames. For example, the video output module 127 reads all of the postproduction frames from the post-modification database and obtains the processed video by combining all of the postproduction frames.

Figure 5:
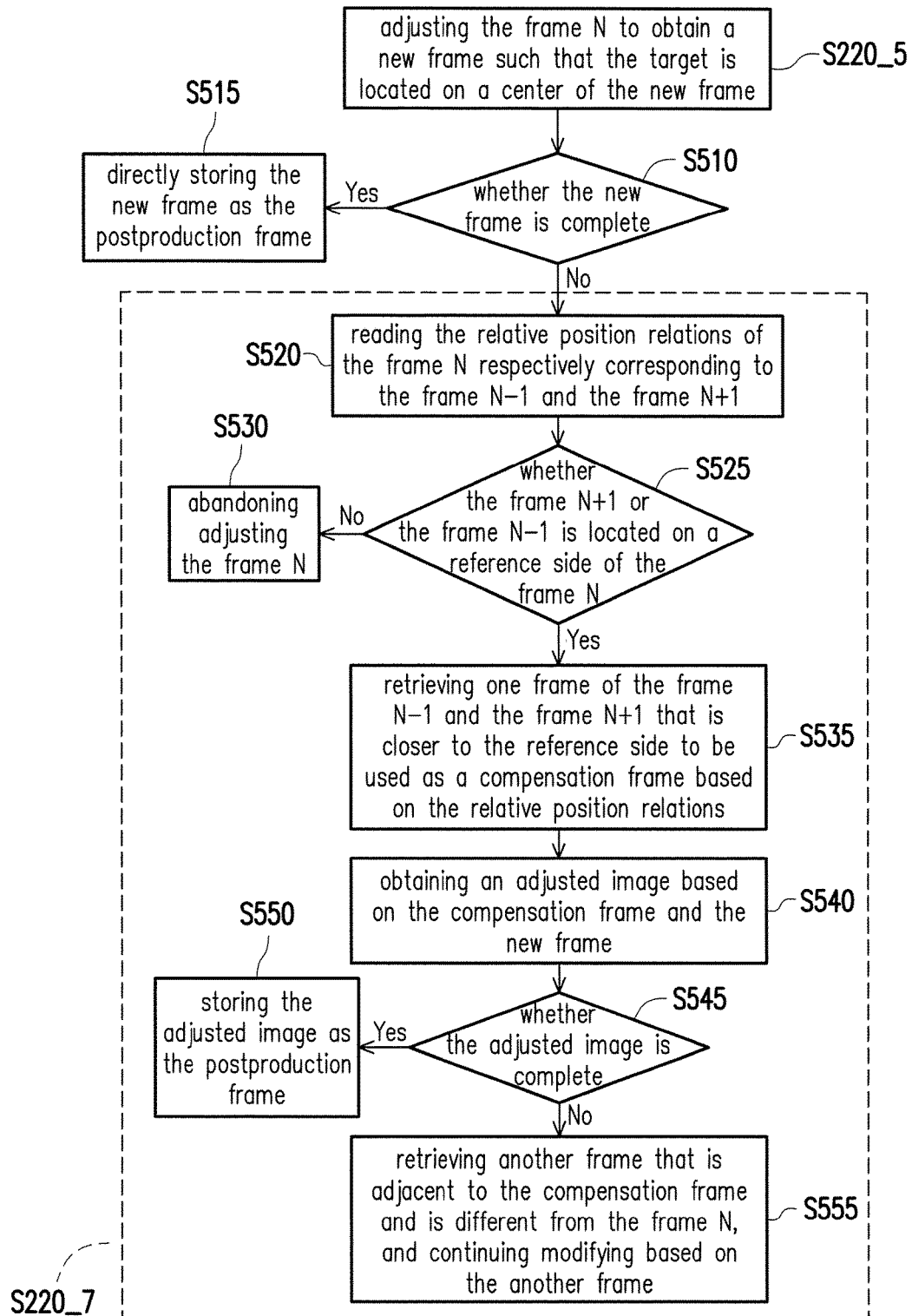
FIG. 5 is a flowchart illustrating a method of modifying a frame according to an embodiment of the invention.

Examples are provided below to illustrate the process of modifying the frames. FIG. 5 is a flowchart illustrating a method of modifying a frame according to an embodiment of the invention. Referring to FIG. 5, after step S220_5, the video modification module 125 executes step S510 to determine whether the new frame is complete. For example, it is determined whether the blank region exists in the new frame, or it is determined whether the new frame contains a defect region. When the blank region or the defect region exists in the new frame, it is determined that the new frame is not complete. In the case where it is determined that the new frame is not complete, step S220_7 is executed. Step S220_7 further includes steps S520 to S555.

On the other hand, in the case where the new frame is complete (for example, the blank region or the defect region does not exist), as indicated by step S515, the video modification module 125 does not modify the new frame but the new frame is directly stored as the postproduction frame. In other words, in the case where the video modification module 125 determines that the new frame is complete (which means that the target is originally located on the center of the frame N), the new frame directly stored to the post-modification database without modifying the new frame.

In the case where it is determined that the blank region exists in the new frame, a position of the blank region in the new frame is further detected, and one of the frame N−1 and the frame N+1 that is closer to the position is retrieved based on the relative position relations to be used as a compensation frame.

Specifically, in step S520, the video modification module 125 reads the relative position relations of the frame N respectively corresponding to the frame N−1 and the frame N+1. Moreover, after detecting the position of the blank region in the new frame, the video modification module 125 sets a reference side based on the position of the blank region in the new frame. For example, when the blank region is located on the left side of the new frame, the reference side is set as the left side; when the blank region is located on the right side of the new frame, the reference side is set as the right side.

Then, in step S525, it is determined whether the frame N+1 or the frame N−1 is located on the reference side of the frame N. If it is determined that neither of the frame N−1 and the frame N+1 is located on the reference side of the frame N, adjusting the frame N is abandoned, as indicated by step S530.

If it is determined that the frame N+1 or the frame N−1 is located on the reference side of the frame N, in step S535, one frame of the frame N−1 and the frame N+1 that is closer to the reference side is retrieved to be used as the compensation frame based on the relative position relations obtained in step S520. For example, it is supposed that the reference side is the left side, and the retrieved relative position relations include N+1 {point A; L=1; R=0} and N−1 {point A; L=0; R=1}. Since the frame N+1 is close to the left side, the frame N+1 is used as the compensation frame. As another example, it is supposed that the reference side is the upper side, and the retrieved relative position relations include N+1 {point A; U=1; D=0} and N−1 {point A; U=0; D=1}. Since the frame N+1 is close to the upper side, the frame N+1 is used as the compensation frame.

Next, in step S540, an adjusted image is obtained based on the compensation frame and the new frame. Here, a "cut and paste" method may be used. Namely, according to the size and position of the blank region, a block having the same size as the blank region is cut from a corresponding position in the compensation frame based on the image feature points, and the block is attached to the blank region of the new frame to form the adjusted image. Moreover, a "piece together" method may also be used. Namely, based on the image feature points, the new frame is superimposed on the compensation frame to obtain a superimposed image, and then a block having the same size as the new frame is cut from the superimposed image with the target of the new frame located on the center to obtain the adjusted image. In other words, the new frame is first covered on the compensation frame, and the adjusted image having the same size is then cut. The "piece together" method requires positioning image borders of the adjusted image to be cut. The method of positioning the borders may include recording the borders of the new frame as the borders to be cut, or redefining the borders with the target of the new frame as the center.

The new frame and the compensation frame are superimposed. The method of superimposition may include finding the same image feature points according to the SIFT algorithm or the SURF algorithm, and performing superimposition according to the same image feature points. Here, the superimposed image may be obtained by using the method proposed in a paper titled "Smoothly Varying Affine Stitching", published as pages 345 to 352 in Computer Vision and Pattern Recognition (CVPR) (2011) of the Institute of Electrical and Electronics Engineers (IEEE).

Then, in step S545, it is determined whether the adjusted image is complete, for example, by determining whether a blank region or a defect region exists in the adjusted image. If the adjusted image is complete, the adjusted image is stored as the postproduction frame, as indicated by step S550. If the adjusted image is not complete (for example, the blank region or the defect region exists), another frame that is adjacent to the compensation frame and is different from the frame N is retrieved, and modification continues based on the another frame, as indicated by step S555.

For example, supposing that the frame N−1 is retrieved as the compensation frame in step S535, when it is determined in step S545 that the adjusted image is not complete, a frame N−2 is retrieved in step S555 as a next compensation frame to further modify the adjusted image. If the re-obtained adjusted image is still not complete, a frame N−3 is retrieved as a next compensation frame, and the step repeats until the obtained adjusted image is complete (namely, the blank region or the defect region does not exist). In another embodiment, when it is determined in step S545 that the adjusted image is not complete, a frame N+2 is retrieved as a next compensation frame to further modify the adjusted image. If the re-obtained adjusted image is still not complete, a frame N+3 is retrieved as a next compensation frame, and steps S540 to S555 are repeated, and so on. Moreover, a threshold value may be further set. When a count of modifications exceeds the threshold value but a complete adjusted image still cannot be obtained, the adjusted image corresponding to the frame N is abandoned, and returning to step S220_1, the next frame (N=N+1) is retrieved to execute the adjustment process, until all of the frames have undergone the adjustment process.

The text below describes the method of "piece together" applied to the case where the blank region in the new frame obtained based on the frame N is located on the left side. First, based on the relative position relations, it is determined whether the frame N−1 is located on the leftmost side of the frame N. If it is determined that the frame N−1 is located on the leftmost side of the frame N, the frame N−1 is obtained. Then, the new frame and the frame N−1 are superimposed. Next, the adjusted image is re-obtained with the target of the frame N as the center. Afterwards, it is determined whether the adjusted image is complete. Namely, it is determined whether a blank region exists in the adjusted image. If it is determined that the adjusted image is complete, the adjusted image is stored as the postproduction frame. If it is determined that the adjusted image is not complete, a previous frame is retrieved (the previous frame of the frame N−1 is the frame N−2). Moreover, it is determined whether the retrieved previous frame is a null value, namely, whether the previous frame exists. If it is a null value, adjusting the frame N is abandoned. If it is not a null value, the retrieved previous frame is then superimposed with the adjusted image.

If the frame N+1 is located on the leftmost side of the frame N, the frame N+1 is obtained. Then, the new frame and the frame N+1 are superimposed. Next, the adjusted image is re-obtained with the target of the frame N as the center. Afterwards, it is determined whether the adjusted image is complete. Namely, it is determined whether a blank region exists in the adjusted image. If it is determined that the adjusted image is complete, the adjusted image is stored as the postproduction frame. If it is determined that the adjusted image is not complete, a next frame is retrieved (the next frame of the frame N+1 is the frame N+2). Moreover, it is determined whether the retrieved next frame is a null value, namely, whether the next frame exists. If it is a null value, adjusting the frame N is abandoned. If it is not a null value, the retrieved next frame is then superimposed with the adjusted image.

The description for the case where the blank region is located on the right side of the new frame is identical to that for the case of the left side and is not repeated here, since it can be analogously inferred from the description above. In other embodiments, if it is determined that the adjusted image is not complete, another frame closer in time may also be retrieved and then superimposed, and the step is not limited to the previous frame or the next frame.

Figure 6A:
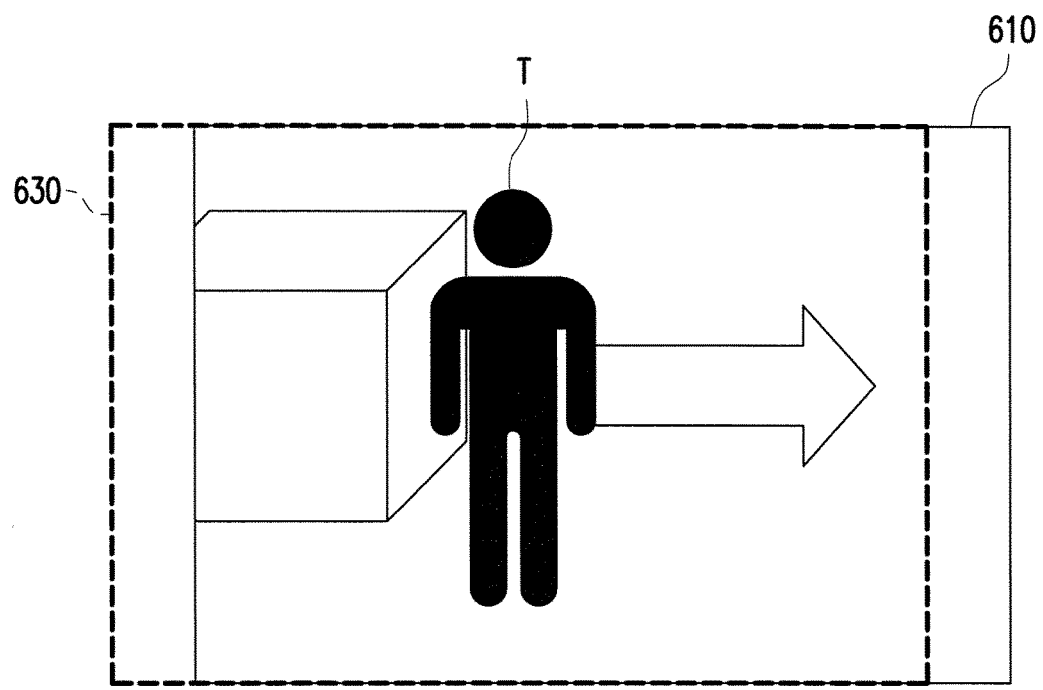
FIG. 6A to FIG. 6D are schematic diagrams illustrating modifying a frame according to an embodiment of the invention.
Figure 6B:
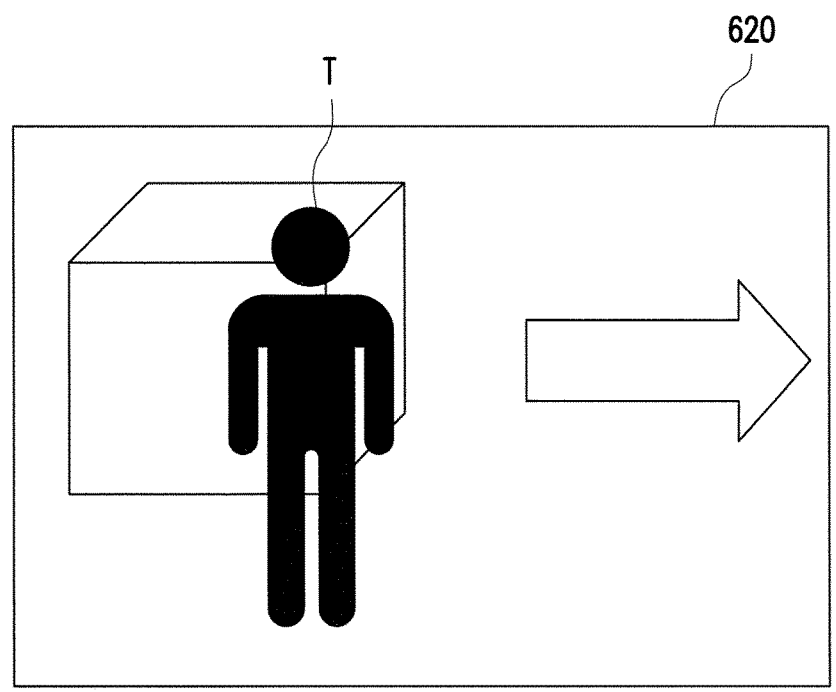
Figure 6C:
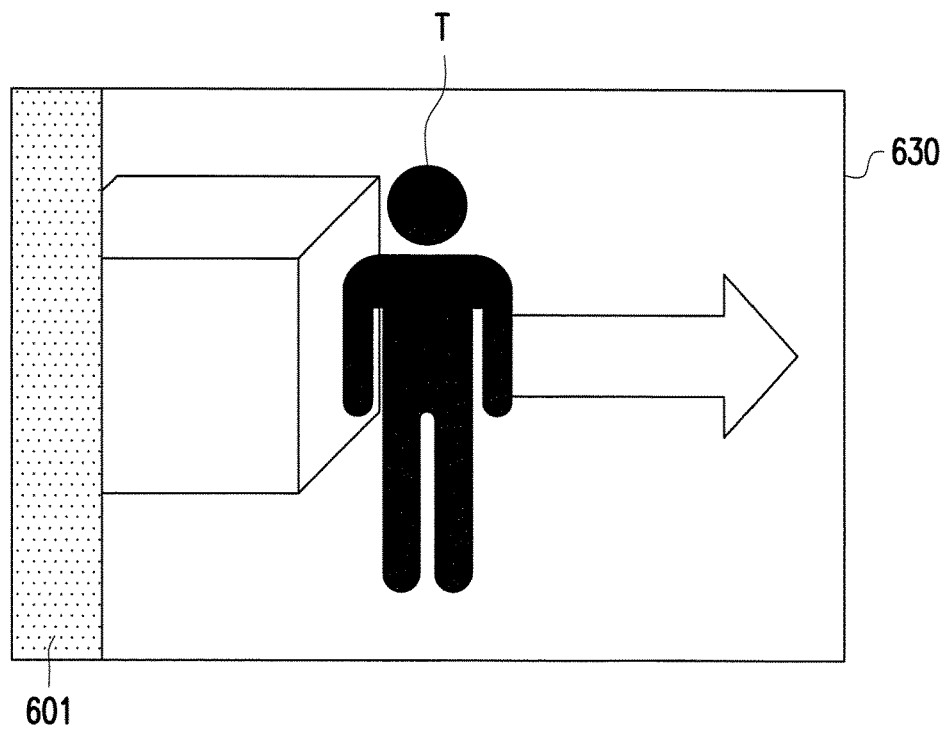
Figure 6D:
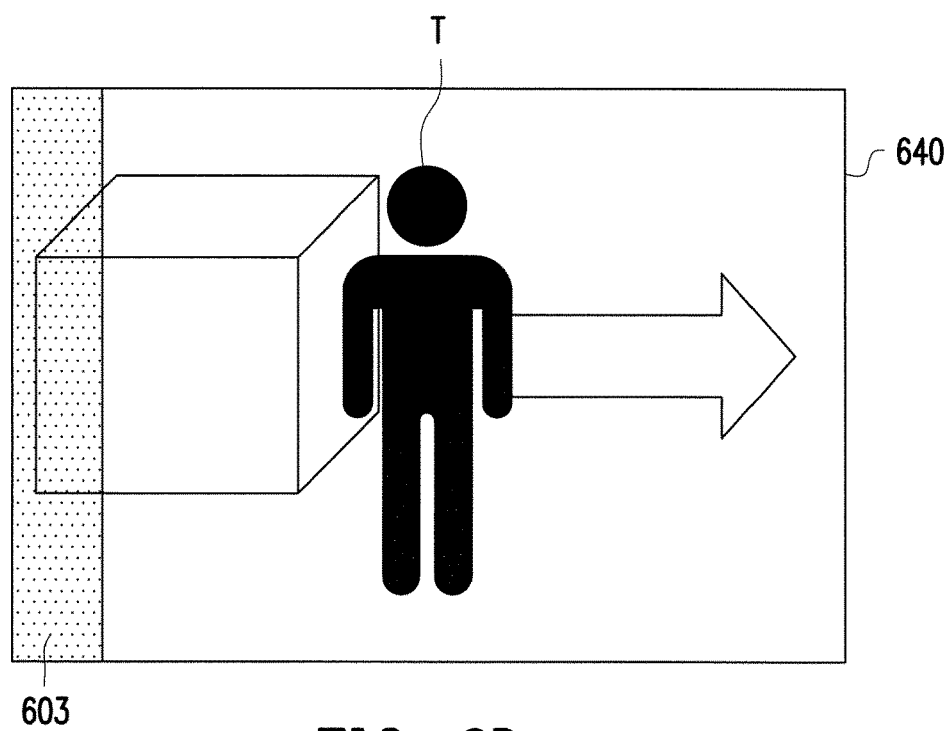

Another embodiment is provided below for illustration. FIG. 6A to FIG. 6D are schematic diagrams illustrating modifying a frame according to an embodiment of the invention. FIG. 6A illustrates a currently retrieved frame 610 to be processed. FIG. 6B illustrates a next frame 620 of the frame 610. FIG. 6C illustrates a new frame 630. FIG. 6D illustrates an adjusted image 640. In the present embodiment, the frame 620 is located on the left side of the frame 610. Referring to FIG. 6A and FIG. 6C, the new frame 630 is obtained by setting a target T of the frame 610 on the center, and a blank region 601 is formed on the left side of the new frame 630. Moreover, the adjusted image 640 is obtained by using the frame 620 as the compensation frame, as shown in FIG. 6D. For example, the adjusted image 640 may be obtained by using the "cut and paste" or "piece together" method.

Figure 7:
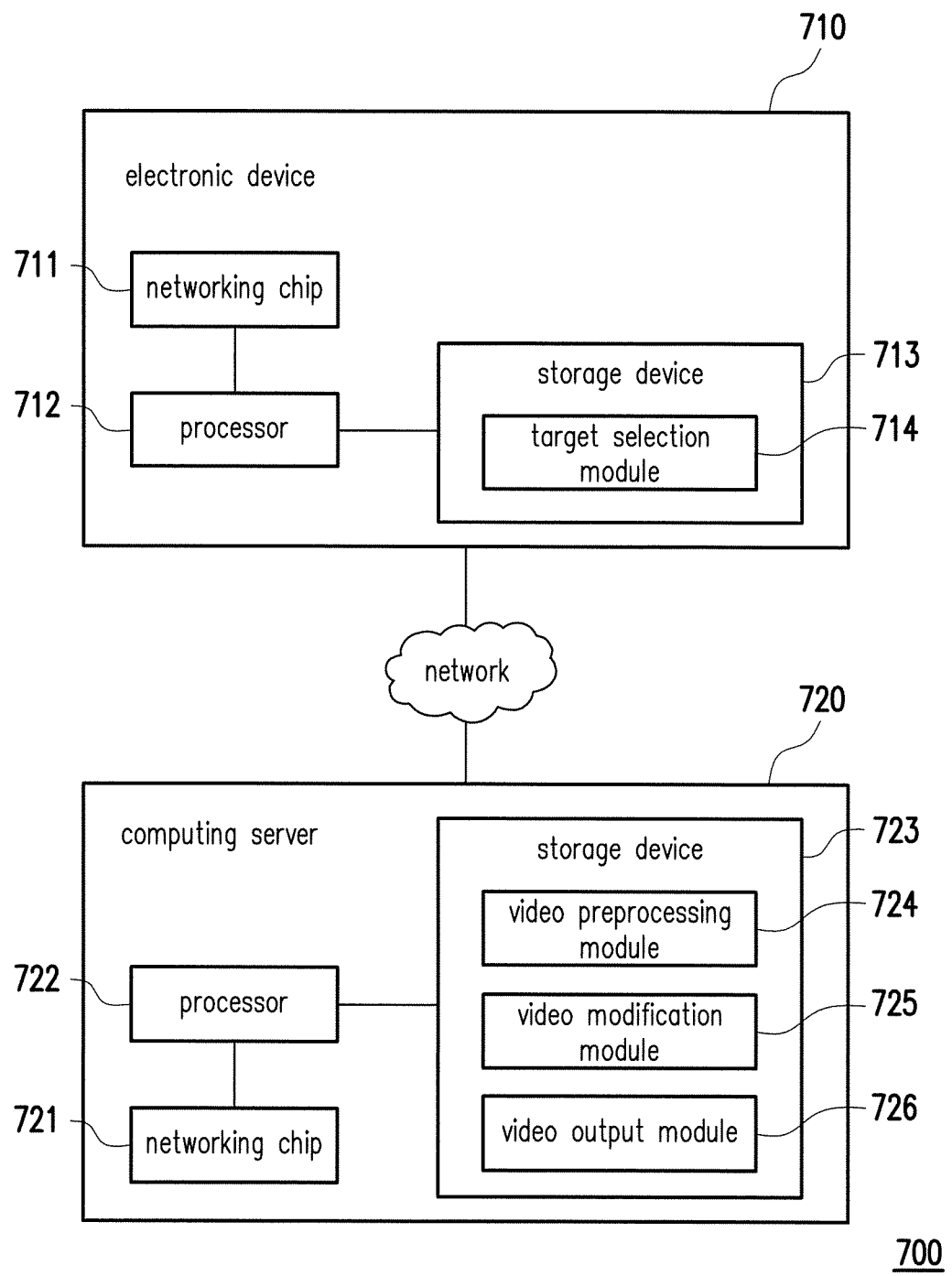
FIG. 7 is a block diagram illustrating a video editing system according to an embodiment of the invention.

FIG. 7 is a block diagram illustrating a video editing system according to an embodiment of the invention. Referring to FIG. 7, a video editing system 700 includes an electronic device 710 and a computing server 720. The electronic device 710 is, for example, a smartphone, a tablet computer, a digital camera, a video camera, a surveillance device, a wearable device, etc. The electronic device 710 includes a networking chip 711, a processor 712, and a storage device 713. The storage device 713 includes a target selection module 714. The processor 712 is coupled to the networking chip 711 and the storage device 713 and executes the target selection module 714 to realize corresponding functions.

The computing server 720 is, for example, an electronic device having higher computational capacity, such as a desktop computer, a laptop, etc. The computing server 720 includes a networking chip 721, a processor 722, and a storage device 723. The storage device 723 includes a video preprocessing module 724, a video modification module 725, and a video output module 726. The processor 722 is coupled to the networking chip 721 and the storage device 723 and executes the video preprocessing module 724, the video modification module 725, and the video output module 726 to realize corresponding functions.

The networking chips 711, 721 are components having networking functions, such as a wired network card or a wireless network card. The networking chips 711, 721 provide a WiFi module, a WLAN (Wireless LAN) module, a 3G (third generation of wireless mobile telecommunications technology) module, a 4G (fourth generation of wireless mobile telecommunications technology) module, or an LTE (Long Term Evolution) module.

The electronic device 710 is connected to a network through the networking chip 711 to be further connected to the networking chip 721 of the computing server 720 to transmit data via the network. A target is box-selected through the electronic device 710, and an original video and the target (target features) are transmitted to the computing server 720, such that the computing server 720 can execute video-editing on the original video and transmit the processed video to the electronic device 710. Moreover, in other embodiments, data may also be transmitted via a USB.

In the present embodiment, the processors 712, 722 are similar to the processor 110, and the storage devices 713, 723 are similar to the storage device 120. In addition, the functions of the target selection module 714, the video preprocessing module 724, the video modification module 725, and the video output module 726 are respectively similar to those of the target selection module 121, the video preprocessing module 123, the video modification module 125, and the video output module 127. Therefore, reference may be made to the preceding text for relevant descriptions, which are not repeated here.

In summary of the above, through the method described above, the user only needs to input a video and box-select a target and then can output a video in which the target is positioned on the center. Supposing that the user inputs a follow shot, after being processed by the method of the invention, a stable follow shot in which the filmed subject remains stably unmoved but the environment keeps moving can be edited.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A video editing method comprising:
   receiving an original video, wherein the original video comprises multiple frames;
   obtaining a target from the original video;
   obtaining relative position relations respectively between each of the frames and a previous frame and a next frame adjacent to it based on multiple image feature points of each of the frames;
   executing an adjustment process respectively for the frames, wherein the adjustment process comprises steps below:
   retrieving a frame N from the frames;
   identifying the target in the frame N;
   adjusting the frame N to obtain a new frame, wherein the target is located on a center of the new frame; and
   modifying the new frame based on the relative position relations to obtain a postproduction frame; and
   outputting a processed video based on multiple postproduction frames.

2. The video editing method according to claim 1, wherein the step of adjusting the frame N to obtain the new frame, wherein the target is located on the center of the new frame comprises:
   creating a blank frame according to a size of the frame N; and
   superimposing the frame N onto the blank frame by setting the target as a center of the blank frame to obtain the new frame.

3. The video editing method according to claim 2, wherein before the step of modifying the new frame based on the relative position relations to obtain the postproduction frame, the video editing method further comprises:
   determining whether the new frame is complete;
   modifying the new frame based on the relative position relations to obtain the postproduction frame in the case where the new frame is not complete; and
   storing the new frame as the postproduction frame without modifying the new frame in the case where the new frame is complete.

4. The video editing method according to claim 3, wherein in the case where the new frame is not complete, the video editing method further comprises:
   detecting a position of a blank region in the new frame;
   retrieving one of a frame N−1 and a frame N+1 corresponding to the frame N that is closer to the position as a compensation frame based on the relative position relations; and
   obtaining an adjusted image based on the new frame and the compensation frame.

5. The video editing method according to claim 4, wherein after the step of detecting the position of the blank region in the new frame, the video editing method further comprises:
   setting a reference side based on the position of the blank region in the new frame;
   determining whether the frame N−1 and the frame N+1 are located on the reference side of the frame N;
   retrieving one of the frame N−1 and the frame N+1 that is closer to the reference side as the compensation frame based on the relative position relations if it is determined that the frame N−1 or the frame N+1 is located on the reference side of the frame N; and
   abandoning adjusting the frame N if it is determined that neither of the frame N−1 and the frame N+1 is located on the reference side of the frame N.

6. The video editing method according to claim 4, wherein the step of obtaining the adjusted image based on the new frame and the compensation frame comprises:
   cutting a block corresponding to the blank region from the compensation frame according to the image feature points, and a size and the position of the blank region, and attaching the block to the blank region of the new frame.

7. The video editing method according to claim 4, wherein the step of obtaining the adjusted image based on the new frame and the compensation frame comprises:
   superimposing the new frame onto the compensation frame based on the image feature points to obtain a superimposed image; and
   cutting a block having the same size as the new frame in the superimposed image with the target as the center.

8. The video editing method according to claim 4, wherein after the step of obtaining the adjusted image based on the new frame and the compensation frame, the video editing method further comprising:
   determining whether the adjusted image is complete;
   storing the adjusted image as the postproduction frame if the adjusted image is complete; and
   retrieving another frame that is adjacent to the compensation frame and is different from the frame N and continuing modifying based on the another frame if the adjusted image is not complete.

9. The video editing method according to claim 1, wherein the step of obtaining the relative position relations respectively between each of the frames and the previous frame and the next frame adjacent to it based on the image feature points of each of the frames comprises:
determining a first relative position of the frame N+1 relative to the frame N based on the image feature points in the frame N and the image feature points in the frame N+1;
determining a second relative position of the frame N−1 relative to the frame N based on the image feature points in the frame N and the image feature points in the frame N−1; and
storing the first relative position and the second relative position as the relative position relations of the frame N.

10. A video editing device comprising:
a storage device storing multiple modules; and
a processor coupled to the storage device and executing the modules to edit an original video, the original video comprising multiple frames,
wherein the processor receives the original video and obtains a target from the original video,
the processor obtains relative position relations respectively between each of the frames and a previous frame and a next frame adjacent to it based on multiple image feature points of each of the frames,
the processor executes an adjustment process respectively for the frames, the adjustment process comprising: retrieving a frame N from the frames; identifying the target in the frame N; adjusting the frame N to obtain a new frame, wherein the target is located on a center of the new frame; and modifying the new frame based on the relative position relations to obtain a postproduction frame, and
the processor outputs a processed video based on multiple postproduction frames.

11. The video editing device according to claim 10, wherein the processor creates a blank frame according to a size of the frame N, and superimposes the frame N onto the blank frame by setting the target as a center of the blank frame to obtain the new frame.

12. The video editing device according to claim 11, wherein the processor determines whether the new frame is complete, and modifies the new frame based on the relative position relations to obtain the postproduction frame in the case where the new frame is not complete, and stores the new frame as the postproduction frame without modifying the new frame in the case where the new frame is complete.

13. The video editing device according to claim 12, wherein the processor detects a position of a blank region in the new frame, retrieves one of a frame N−1 and a frame N+1 corresponding to the frame N that is closer to the position as a compensation frame based on the relative position relations, and obtains an adjusted image based on the new frame and the compensation frame.

14. The video editing device according to claim 13, wherein the processor sets a reference side based on the position of the blank region in the new frame, determines whether the frame N−1 and the frame N+1 are located on the reference side of the frame N, retrieves one of the frame N−1 and the frame N+1 that is closer to the reference side as the compensation frame based on the relative position relations if it is determined that the frame N−1 or the frame N+1 is located on the reference side of the frame N, and abandons adjusting the frame N if it is determined that neither of the frame N−1 and the frame N+1 is located on the reference side of the frame N.

15. The video editing device according to claim 13, wherein the processor cuts a block corresponding to the blank region from the compensation frame according to the image feature points, and a size and the position of the blank region, and attaches the block to the blank region of the new frame.

16. The video editing device according to claim 13, wherein the processor superimposes the new frame onto the compensation frame based on the image feature points to obtain a superimposed image, and cuts a block having the same size as the new frame in the superimposed image with the target as the center.

17. The video editing device according to claim 13, wherein the processor determines whether the adjusted image is complete, stores the adjusted image as the postproduction frame if the adjusted image is complete, and retrieves another frame that is adjacent to the compensation frame and is different from the frame N and continues modifying based on the another frame if the adjusted image is not complete.

18. The video editing device according to claim 10, wherein the processor determines a first relative position of the frame N+1 relative to the frame N based on the image feature points in the frame N and the image feature points in the frame N+1, determines a second relative position of the frame N−1 relative to the frame N based on the image feature points in the frame N and the image feature points in the frame N−1, and stores the first relative position and the second relative position as the relative position relations of the frame N.

19. A video editing system comprising:
a computing server; and
an electronic device comprising:
    a first networking chip; and
    a first processor coupled to the first networking chip, receiving an original video comprising multiple frames and obtaining a target from the original video, and transmitting the original video and the target to the computing server through the first networking chip to make the computing server executes video-editing on the original video and transmits a processed video to the electronic device,
wherein the computing server comprises:
    a second networking chip receiving the original video and the target from the electronic device via a network; and
    a second processor coupled to the second networking chip,
wherein the second processor obtains relative position relations respectively between each of the frames and a previous frame and a next frame adjacent to it based on multiple image feature points of each of the frames,
the second processor executes an adjustment process respectively for the frames, the adjustment process comprising: retrieving a frame N from the frames; identifying the target in the frame N; adjusting the frame N to obtain a new frame, wherein the target is located on a center of the new frame; and modifying the new frame based on the relative position relations to obtain a postproduction frame, and
the second processor outputs the processed video based on multiple postproduction frames.

\* \* \* \* \*